UNITED STATES PATENT OFFICE.

HALVOR HALVORSON, OF CAMBRIDGE, MASSACHUSETTS, ASSIGNOR TO HIMSELF, E. H. BARKER, I. F. ATHEARN, AND WM. T. EUSTIS.

IMPROVEMENT IN PURIFYING OILS.

Specification forming part of Letters Patent No. 17,181, dated April 28, 1857.

*To all whom it may concern:*

Be it known that I, HALVOR HALVORSON, of Cambridge, in the county of Middlesex and State of Massachusetts, have made certain new and useful improvements in the process of manufacturing oils and other substances from lard and other similar animal and vegetable fats or butters, as well as the purification of ordinary fat and unctuous limped oils; and I do declare that the following is a true and faithful description of the same.

The nature of my invention or discovery consists in the separation of the solid from the liquid constituents of fats by certain chemical means, which I will now proceed more particularly to describe.

In the manufacture of lard and similar oils from sources comparatively solid at common and ordinary temperatures it is generally a practice to submit the materials to mechanical pressure for the expulsion of the oleine or liquid constituent. This is a lengthy, tedious, and expensive process, especially when artificial refrigeration is rendered necessary; but, aside from this, lard is itself a product or a manufactured substance; secondly, has been "tried out" or rendered from the leaf or from pork, in which process heat is generally employed to an extent which more or less discolors the product.

To obviate many objections which in the course of my specification I shall point out as existing in the usual process, I take in the first place pork, leaf-lard, or any similar solid fat substance and submit it to a steam-bath barely sufficient to fuse the stearine, which is effected at about 150° to 160° Fahrenheit, then skim off the entire melted portion into another vessel, and while yet warm I apply an alcoholic solution of an appropriate alkali, soda, or potash of a strength varying according as I wish to obtain a strong or weak oil or pure or mixed oleine. The strength usually employed is a solution of caustic alkali in alcohol 95° that shall indicate 965° Gay-Lussac at a temperature of 62° Fahrenheit. A solution of this strength will saponify a volume of stearine equal to its own bulk. On the mixture of this solution with the oils, saponification instantly ensues, and I have a clear, limpid, homogeneous mass for subsequent treatment. I now boil, by steam or otherwise, the remaining fibrous, albuminous, and gelatinous portions of the pork or lard, when the albumen will coagulate, the gelatine dissolve, and the fibers become soft and tender. I then discontinue the boiling, let the dissolved gelatine, water, and albumen subside, skim off what little additional portion of fat may have been rendered liquid, and then submit the intermediate soft, pulpy, fibrous pork or lard to fluted steam-heated rollers, when all available and desirable fat will be expelled from the broken fibrous cells, and as all passes from the rollers to a receptacle sufficiently near to prevent congelation of the stearine the impurities and soap-stock will subside, and a clean stearine may again be skimmed off. This I also saponify in the same manner as the previous product by an alcoholic lye. If previous to this saponification I have ascertained by any means that a sufficient quantity of oleine to be an object to economize remains, I apply the lye accordingly, so as to saponify only the stearine. As I stated before, I left my first product a limpid, transparent, homogeneous mass. If I now to this apply a small quantity of water—say one eighth—this will unite with the alcoholic soap and increase its specific gravity, so that in a few seconds a precipitation takes place, and if the water has been properly applied a clear supernatant layer of oil is ready to be drawn off. I have here produced a perfectly white limpid strong oil in a few minutes, whereas by the usual routine a week would have been consumed. I have now a dissolved soap left. This I decompose by any acid whose salt I deem merchantable—for example, by tartaric acid—and thence obtain cream of tartar or nitric acid, yielding me saltpeter.

Where oils are purified in the ordinary way by the use of alkalies a large amount of carbonate remains mixed with the other ingredients without performing any part in the purifying process. By my process the alcohol dissolves only the caustic alkali, leaving the carbonate, which falls to the bottom and may be rendered available for other purposes. After the process is completed the alcohol may again be removed by distillation.

I do not claim clarifying oils by means of caustic lye and subsequently washing out the stearine soap by means of alcohol; but

What I claim as my invention, and desire to secure by Letters Patent in the process of manufacturing or purifying oils, is—

The employment of alcoholic solutions of alkali in the manner substantially as herein set forth.

H. HALVORSON.

Witnesses:
 THOS. R. ROACH,
 P. E. TESCHEMACHER.